(12) United States Patent  
Stockhammer

(10) Patent No.: US 8,560,921 B2  
(45) Date of Patent: Oct. 15, 2013

(54) PROTOCOL EXTENSIONS TO SUPPORT VARYING FEC TYPES

(75) Inventor: Thomas Stockhammer, Bergen (DE)

(73) Assignee: Digital Fountain, Inc., San Diego, CA (US)

( * ) Notice: Subject to any disclaimer, the term of this patent is extended or adjusted under 35 U.S.C. 154(b) by 1029 days.

(21) Appl. No.: 12/099,069

(22) Filed: Apr. 7, 2008

(65) Prior Publication Data

US 2008/0250298 A1 Oct. 9, 2008

Related U.S. Application Data

(60) Provisional application No. 60/910,443, filed on Apr. 5, 2007, provisional application No. 60/940,963, filed on May 30, 2007.

(51) Int. Cl.  
*H03M 13/00* (2006.01)

(52) U.S. Cl.  
USPC .......................................................... 714/762

(58) Field of Classification Search  
None  
See application file for complete search history.

(56) References Cited

U.S. PATENT DOCUMENTS

2008/0092013 A1* 4/2008 Hollums ....................... 714/762

OTHER PUBLICATIONS

Kornfeld et al., DVB-H—the emerging standard for mobile data communication, Jan. 2005, EBU Technical Review, pp. 1-10.*  
"DVB-H Tutorial", Radio-Electronics.com.*  
DVB Digital Video Broadcasting, "IP Datacast over DVB-H: Content Delivery Protocols (CDP)" DVB Document A101, Dec. 2005, pp. 1-72.  
ETSI EN 301 192 V1.5.1 (Nov. 2009), Digital Video Broadcasting (DVB); DVB specification for data broadcasting, pp. 1-80.  
Paila, T. et al., "Flute—File Delivery over Unidirectional Transport" Network Working Group, RFC 3926. The Internet Society (Oct. 2004).  
Speakman, et al., "PGM Reliable Transport Protocol Specification," Network Working Group, Request for Comments: 3208, Dec. 2001, pp. 1-111.

* cited by examiner

*Primary Examiner* — Michael Maskulinski  
(74) *Attorney, Agent, or Firm* — Ryan N. Farr

(57) ABSTRACT

A transmitter sends a series of transport bursts, each containing a data burst and possibly also repair data, indicated as distinct from data of the data bursts. Source blocks comprise data from more than one data burst and from those, repair symbols are generated.

16 Claims, 1 Drawing Sheet

FEC Streaming Framework Architecture

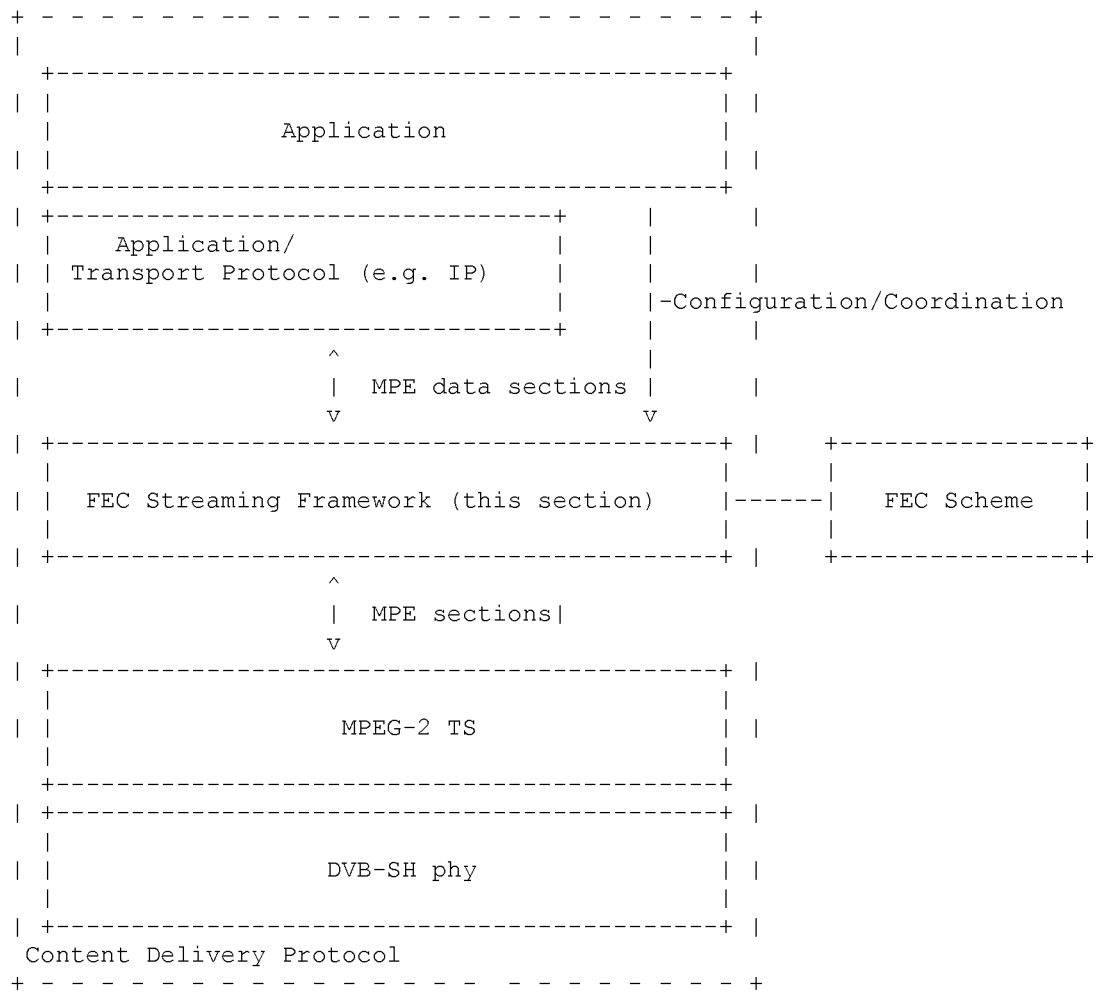
FEC Streaming Framework Architecture

PROTOCOL EXTENSIONS TO SUPPORT VARYING FEC TYPES

CROSS-REFERENCES TO RELATED APPLICATIONS

This application claims the benefit of U.S. Provisional Application No. 60/910,443 entitled "Sliding MPE-FEC Encoding With Multi-Stage Chain Reaction," filed Apr. 5, 2007. This application also claims the benefit of U.S. Provisional Application No. 60/940,963 entitled "Protocol Extensions To Support Varying FEC Types," filed May 30, 2007. The contents of these applications are herein incorporated by reference in their entirety for all purposes.

BACKGROUND OF THE INVENTION

The present invention relates generally to data communications and in particular to forward error correction (FEC) coding.

There are a number of ways to encode data with FEC over a unidirectional transport channel. For example, T. Paila, M. Luby, R. Lehtonen, V. Roca, R. Walsh, T. Paila, M. Luby, R. Lehtonen, V. Roca, R. Walsh, "FLUTE-File Delivery over Unidirectional Transport", RFC 3926 (October 2004) provides some background on file delivery techniques. DVB-CBMS, "IP Datacast over DVB-H; Content Delivery Protocols (CDP)", DVB Document A101 (December 2005), "PGM Reliable Transport Protocol Specification", RFC 3208 (December 2001) provide more background information.

Digital video broadcasting is described in "Digital Video Broadcasting (DVB); DVDB Specification for Data Broadcasting", ETSI Document EN 301 192 V. 1.4.2 (2008-04) (hereinafter "EN 301192").

BRIEF SUMMARY OF THE INVENTION

In a transmitter, data is sent as a series of transport bursts. Data is obtained as data bursts and each transport burst contains a data burst. At least some of the data of a plurality of the data bursts is stored at the transmitter and source blocks are stored that comprise data from the plurality of data bursts. From the source blocks, repair symbols are generated. Repair symbols are inserted into transport bursts with metadata that indicates that the repair symbols are distinct from data symbols.

The metadata might include an indication of a particular FEC scheme used to generate the repair symbols from the source blocks and/or indications of how the data bursts map to the source blocks.

BRIEF DESCRIPTION OF THE DRAWINGS

FIG. 1 shows an example of the FEC streaming framework architecture.

DETAILED DESCRIPTION OF THE INVENTION

1. Proposed Framework 1.1 Transmission Framework

It is assumed that data is transmitted in logical units of bursts. Bursts can be logical transport bursts as in DVB-SH or can be "group of pictures" bursts in a video or both. A burst comprises individual packets generally having different lengths. The bursts also generally have variable length, but are bounded to a certain maximum number of bytes, referred to herein by "$N_B$".

The bursts should be transmitted unmodified to fulfill legacy constraints. Furthermore, the data bursts are transmitted in transport bursts whereby each transport burst contains exactly one data burst.

Each transport burst and therefore each data burst are uniquely identifiable by a burst number i. However, the transport burst might contain, in addition to the data burst, some forward error correction (FEC) data, which relates to the data burst, such that losses of packets in the data bursts can be compensated.

The repair data is sent in a similar format as the source data, but the header of the repair data allows the FEC data to be distinguished from the source data.

1.2 Parameters

Below is an example of one set of parameters that can be used with this framework.

TABLE 1

Possible Parameters for Proposed Framework

| Parameter | Description | Range |
|---|---|---|
| F | FEC Encoding Frequency (Data Bursts/SB) | F = 1, . . . , tbd |
| B | FEC Data Interleaving | B = F, 2F, 3F, . . . |
| S | FEC Spread | S = F, 2F, 3F, . . . |
| D | Early sending of FEC, D = 0, FEC right after data, D = B, | D = −tbd, . . . , 0, . . . , B, . . . |
| Cmax | Maximum Number of Data Columns per Slice | Cmax = 191 |
| C | Number of Data Columns per Burst | C = 0, . . . , Cmax |
| R | Number of Rows | R = 256, 512, 768, 1024 |
| T | Symbol Size | T = 32, . . . , R (dividable by R) |
| G | Maximum number of symbols per section | Gmax = 1, . . . , R/T |
| M | Concurrent source blocks | M = 1, . . . |
| $N_B$ | Number of maximum bytes in data burst | |
| Kmax | Maximum number of data symbols in source block | |
| Nmax | Maximum number of FEC symbols in source block | |

To ensure that an encoder can always encode the source data, the data burst size should not exceed the total amount of available source symbols per burst, i.e., ceil(NB/T)≤floor (Kmax/F).

Initiliazation

Assume that the encoder knows the total amount of concurrent source blocks, M, as well as the bursts being stored at the transmitter, X, and at the receiver, Y. These numbers can be either explicitly or implicitly provided. For the framework considered in one possible embodiment, the initialization process for the extended MPE-FEC is as set forth in the source code listing below:

```
/* Number of concurrent source blocks to be remembered at the
                transmitter and receiver */
M = (MAX(B-D, D-B)+S)/F;
/* How many data bursts do I have to store at the transmitter? */
X = MAX(1, D);
/* How many data bursts do I have to remember at the receiver? */
Y = MAX(B-D, D-B)+S+1;
/* Maximum Number of Symbols per Row */
Gmax = R/T;
```

Encoder Definition

In one embodiment of an encoder, during the encoder initialization, M concurrent source block matrices SB (0), . . . , SB(M−1) are allocated with each data matrix size Kmax*T to host the encoding. FEC symbols can generally be produced on-the-fly from the source data directly or for example an intermediate matrix only slightly larger than Kmax, so no explicit FEC matrix needs to be reserved.

In this embodiment, assume the burst with burst number i is received. In that case, some processing is done. This processing can be done in a number of phases, such as a data processing phase, a FEC processing phase, a data transmission phase, and a FEC transmission phase. An example of each of these phases is described below.

In the data processing phase, the encapsulation rules shown below can be applied for each section in burst i:

```
/* Section data */
section_in->table_id = TABLE_ID;
...
section_in->section_length = section_in->length;
/* Real-time parameters */
section_in->address = burst[i]->address;
section_in->delta_t = ...;
burst[i]->address += section_in->upper_layer_PDU->size;
```

Burst i is stored in the transmitter and sequentially inserted in the application data table of size Kmax/F×T, such that we have no_data_columns[i]=(burst[i]>address+T−1)/T encoding symbols denoted as burst[i]→symbol[k].

Burst i is inserted in FEC environment as follows:

```
/* define the number of the burst in the source block     */
burst_no_in_sb = i%F;
/* define number of data columns in burst           */
no_data_columns[i] = (burst[i]-> address + T − 1)/T;
/* Where to start          */
int esi_start = burst_no_in_sb*(Kmax/F);
for(int k=0; k< no_data_columns[i]; k++)
{
    m = get_data_queue_index(i, k+esi_start);
    /* insert column k-esi_start of burst b in matrix m */
    SB[m]->column[fec_enc[m]->write_position] = burst[i]->symbol[k];
    SB[m]->write_position++;
}
for(int k=no_data_columns[i]; k<(Kmax/F); k++)
{
    m = get_data_queue_index(i, k+esi_start);
    /* insert padding in matrix m */
    SB[m]->column[fec_enc[m]->write_position] = 0;
    SB[m]->write_position++;
}
```

In the FEC processing phase, assume a source block is completed and can be used to generate FEC symbols. An example of this is:

```
if(!((i+1)%F) )
{
    /* compute FEC for m=i%(B+S)           */
    int m = (i/F)%M;
    prepare_to_generate_fec(SB[m]);
    SB[m]->fecflag = TRUE;
}
```

In the data transmission phase, the data sections in burst burst[j], j=max(i, i−D) are transmitted without any modifications.

In the FEC transmission phase, the remaining size remaining data of the burst is used to fill it up with FEC.

```
/* Determines the FEC section number*/
int fecsection = 0;
/* Assume that we have space for at least one FEC section*/
section_in->frame_boundary = 0;
while(!section_in->frame_boundary)
{
    /* Section encapsulation - depends on FEC scheme*/
    exmpe_fec_encapsulation(section_in, B, S, F, D, i, fecsection,
            no_data_columns);
    section_in->length = EXMPE_HEADERLENGTH+CRC32_LENGTH;
    /* Numbers section in burst           */
    int m=get_fec_queue_index(i, fecsection);
    /* Numbers encoding symbol id of FEC*/
    section_in->encoding_symbol_id = SB[n]->esi;
    /* Note: if this doesn't work, it can be altered or omitted */
    section_in->prev_burst_size = fe->padding_esi[current_burst->burst_no%B];
    for(int j=0; j<Gmax && SB[m]->esi < Nmax; j++)
    {
        /* generate FEC data - depends on FEC scheme     */
        symbol = generate_FEC_symbols(SB[m], SB[m]->esi);
        add_symbol_to_section_payload(symbol, section_in);
        /* get FEC column        fe->rs_data[current_burst->column] */
        section_in->length += T;
```

```
        remaining_fec_data -= T;
        /* increase fec burst column */
        SB[m]->esi++;
        /* Always check if there is still sufficient space in burst to add symbol
            */
        if(remaining_fec_data < T)
            break;
    }
    /* Is there still enough room for at least one symbol after we have added
            these symbols? */
    if ( still_space_in_burst( ) && SB[m]->esi < Nmax )
    {
        /* We can at least add one more symbol */
        section_in->frame_boundary = 0;
    }
    else
    {
        /* That's it - last packet for this slice*/
        section_in->frame_boundary = 1;
        /* Have completed an entire source block with FEC?  */
        if( !((i+1)%F) )
        {
            /* Yes - completed                              */
            /* Resetting necessary for the FEC block which is up next
                */
            int m = get_data_queue_index(i+1, MAX(B, D+1)/F-1);
            /* Reset sourceblock */
            /* Is this correct? */
            SB[m]->fecflag = FALSE;
            SB[m]->esi = 0;
            /* reset padding esi */
        }
        /* Reset current burst                              */
        reset_burst(burst[i]);
    }
    create_section_crc(section_in)
}
```

Decoder Definition

In one possible embodiment of the receiver, the received sections are inserted into the corresponding decoding blocks in the receiver. For this purpose, the decoder maintains M concurrent decoding block matrices DB(0), . . . , DB(M−1). For simplicity, assume an allocation for each decoding block a matrix of size Nmax*T to host the decoding information. In general only slightly larger memory size Kmax*T need be maintained to store the received encoding symbol IDs along with the ESI number. Indeed, only a size slightly larger than $N_B$*F is sufficient for the decoding process.

A possible decoder operation is presented below. With the complete reception of burst i, the burst is inserted into the FEC decoding blocks using the information provided in the header of the correct data sections and the correct FEC sections. For this purpose, the burst number and the mapping of burst number and section address to decoding blocks should to be known also at the receiver.

```
/* Insert data section in fec decoding blocks                     */
insert_data_sections_in_fec_decoding_blocks(burst[i]);
/* Insert FEC sections in fec decoding blocks                     */
insert_fec_sections_in_fec_decoding_block(burst[i]);
/* collect the padding information for each burst   */
collect_padding_information(no_data_symbols, burst[i]);
/* decode only one source block at this time    */
int m = get_data_queue_index(i+1, MAX(B, D+1)/F-1);
/* decode only one source blockat this time    */
if(DB[m]->in_use && !((i+1)%F) )
{
    /* Set decoding parameters                                    */
    DB[m]->sbl = Kmax;
    /* Before decoding, insert padding information                */
    insert_padding_information(no_data_symbols);
    /* Apply FEC decoding                                         */
    if( fec_decoding(DB[m]) )
    {
        /* FEC decoding was successful                            */
        DB[m]->ei_flag = FALSE;
        /* After decoding - update information in all bursts      */
        for(int j = i-Y+1; j<=i; j++)
        {
            b = burst[(j+Y)%Y];
            if(b->eiflag)
            {
                /* Copy recovered symbols to burst                */
                copy_symbols_to_burst(b, SB[m]);
                /* Try to recover burst   */
                recover_burst(b);
                /* Note: early delivery of bursts would be possible here if
                    b->eiflag = FALSE after recovery */
            }
        }
    }
    /* Deliver all bursts in this FEC block                       */
    for(int j = i-Y+1; j <= (i-Y+F); j++)
    {
        deliver_burst(burst[j]);
        /* Reset burst */
        reset_burst(burst[j]);
    }
    /* Reset decoding block                                       */
    reset_decoding_block(DB[m]);
}
```

Mapping Definition

The mapping of burst and column numbers to data and FEC queue are defined below. One possible mapping is defined by:

```
int get_data_queue_index(int burst_number, int column_no)
{
    return ( (burst_number)/F+column_no%(B/F))%M;
}
```

The mapping can also be left open, if source block number and the column number are signaled explicitly. A possible inherent mapping is shown below.

```
int get_fec_queue_index(int burst_number, int column_no)
{
    return ( (burst_number+D)/F−column_no%(S/F)−1)%M;
}
```

Carriage of Outer FEC Data

The following provides an example of carrying outer FEC Data. In general, each MPE-OFEC section can carry an arbitrary number of the corresponding OFEC-FDT. The length of a column is indicated in field frame_size of the corresponding time_slice_fec_identifier_descriptor, and the number of carried columns can be computed by the dividing the section length by the symbol length.

The number of MPE-FEC sections used to carry OFEC data of and MPE-OFEC Frame should be limited to the number of columns of the OFEC-FDT. However, the number of MPE-OFEC sections delivered may be less, indicating that not all OFEC data is transmitted. In the latter case, the OFEC-decoder can consider bytes on columns not delivered as unreliable.

The syntax and semantics of the MPE-OFEC_section are defined in Table 2.

TABLE 2

MPE-OFEC Section

| Syntax | Number of bits | Identifier |
|---|---|---|
| MPE-OFEC_section ( ){ | | |
|   table_id | 8 | uimsbf |
|   section_syntax_indicator | 1 | bslbf |
|   private_indicator | 1 | bslbf |
|   reserved | 2 | bslbf |
|   section_length | 12 | uimsbf |
|   FEC Scheme relevant information | 16-32 | uimsbf |
|   reserved_for_future_use | 7 | bslbf |
|   current_next_indicator | 1 | bslbf |
|   delta_t | 12 | uimsbf |
|   frame_boundary | 1 | bslbf |
|   table_boundary | 1 | bslbf |
|   padding_information | 18 | uimsbf |
|   for (i=0; i<N; i++) { | | |
|     FEC_data_byte | 8 | uimsbf |
|   } | | |
|   CRC_32 | 32 | uimsbf |
| } | | |

Here is a description of the elements listed in Table 2:

table_id: The field is set to a predetermined value.

section_syntax_indicator: This field is set to 1 and interpreted as in ISO/IEC 13818-6.

private_indicator: This field is set to 0 and interpreted as defined by ISO/IEC 13818-6.

reserved: This field is set to "11."

section_length: This field specifies the number of remaining bytes in the section immediately following this field up to the end of the section, including the CRC.

reserved_for_future_use: These seven bits are set, when not used, to "1111111."

current_next—indicator: This field is set to a value of "1."

Several FEC code relevant fields might be as follows:

Real_ time_parameters delta_t, table_boundary, frame_boundary can be as in EN 301192, with 18 bits of padding information, as described below for FEC code.

FEC_data_byte: This field contains the OFEC data delivered

CRC_32: This field is as defined by ISO/IEC 13818-6. It is calculated over the entire MPE-OFEC_section.

1.3 FEC Streaming Configuration Information

The FEC streaming configuration information (e.g., no_of_rows R, and maximum size of data bursts $N_B$) is independent of the FEC code.

2. Different FEC Schemes 2.1 FEC Object Transmission Information

For specific FEC codes, several of the above parameters and fields need to be defined explicitly. This information is generally referred to as FEC Object Transmission Information, which is specific to a particular FEC scheme. The FEC Object Transmission Information is defined by each FEC Scheme. The protocol defines a means to transport the FEC Object Transmission Information from the sender to the receiver. This then defines a complete delivery protocol.

Specifically, the following parameters get defined:

The table_id for the FEC section

The FEC code

The parameters of the code, Kmax, and Nmax

The encapsulation of the FEC sections

The transport of FEC Object Transmission Information

Other parameters 2.2 MPE-FEC

The regular MPE-FEC can be expressed in this framework. The following definitions are an example of a sufficient definition:

The table_id for the FEC section is 0x???

The FEC code is the RS as defined in EN 301192

The parameters of the code are Kmax=191, and Nmax=64

The encapsulation of the FEC sections is according to EN 301192, section 9.8

The parameters from above are

B=1

S=1

D=1

F=1

M=1

T=R

M=1

X=1

Y=1

2.3 Extended MPE-FEC with Reed-Solomon Codes

The extended MPE-FEC with RS codes can be expressed in this framework. The following definitions are an example of a sufficient definition:

The table_id for the FEC section is 0x???

The FEC code is the RS as defined in EN 301192

The parameters of the code are Kmax=191, and Nmax=64

The encapsulation of the FEC sections is according to SSP0178, section 5

The parameters from above are

B=1, . . . , Bmax

S=1, . . . , Smax

D=0

F=1

T=R

M=(B+S)

X=1
Y=B+S+1

Note that the parameters for F and D could possibly also be loosened for an RS code similar to what is shown below for MSCR codes. However, the flexibility would be significantly lower.

2.4 Extended MPE-FEC with MSCR Codes with Fixed Parameters

The extended MPE-FEC with MSCR codes can be expressed in this framework. Below is an example of how one could apply quite fixed parameter settings:

The table_id for the FEC section is 0x???
The FEC code is the MSCR code as defined in DVB A101 [3]
The parameters of the code are Nmax=57344
The other parameters from above are

| | |
|---|---|
| F = 1, . . . , 32 | (5 bit) |
| B = F, 2F, 3F, . . . , 32F | (5 bit) |
| S = F, 2F, 3F, . . . , 16F | (4 bit) |
| D = 0, (B + S)/2, B + S, −(B + S)/2 | (2 bit) |

Parameter Generation for T and Kmax:

```
T = R;
while( (F*(Nb/T)) <= 4000 && ( T>32 ) )
{
    T/=2;
}
Kmax = F*ceil(Nb/T);
M = (MAX(B−D, D−B)+S)/F;
X = MAX(1, D);
Y = MAX(B−D, D−B)+S+1;
```

FEC Relevant Information:

| | | |
|---|---|---|
| EncodingFrequency F | 5 | uimsbf |
| DataSpread B | 5 | uimsbf |
| FECSpread | 4 | uimsbf |
| AheadSending | 2 | uimsbf |
| SectionNumber | 8 | uimsbf |
| BurstNumber | 8 | uimsbf |

Padding Information:

| | | |
|---|---|---|
| BurstNumberBackwards | 5 | uimsbf |
| NoDataColumns | 13 | uimsbf |

Syntax
See above for FEC Relevant Information
BurstNumberBackwards: gives number 0, . . . , 31, pointing back to burst to which NoDataColumns refers to.
NoDataColumns in burst i-BurstNumberBackwards 2.5 Extended MPE-FEC with Flexible Parameters The extended MPE-FEC with MSCR codes can be expressed in this framework. Below is an example of one expression in this framework:

The table_id for the FEC section is 0x???
The FEC code is the MSCR code as defined in DVB A101 [3]
The parameters of the code are Kmax<8192, and Nmax=57344

The parameters from above are

| |
|---|
| F = 1, . . . , 32 |
| B = F, 2F, 3F, . . . , 32F |
| D |
| T |
| M |

B, F, D, M, Y, and T are transmitted in the setup, e.g., in the INT table.

Example Parameter Generation now at transmitter only:

```
T = R;
while( (F*(Nb/T)) <= 4000 && ( T>32 ) )
{
    T/=2;
}
Kmax = F*ceil(Nb/T);
```

Encapsulation of FEC Relevant Information can be as follows:

| | | |
|---|---|---|
| SourceBlock | 8 | uimsbf |
| SectionNumber | 8 | uimsbf |
| BurstNumber | 8 | uimsbf |

Encapsulation of Padding Information can be as follows:

| | | |
|---|---|---|
| BurstNumberBackwards | 5 | uimsbf |
| NoDataColumns | 13 | uimsbf |

FIG. 1 shows one example of how the FEC Streaming Framework described in this invention fits into the architecture of this system.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for conveying data over a channel by a transmitter, the method comprising:
generating a sequence of a plurality of data bursts, wherein each of the plurality of data bursts is assigned a unique burst identifier;

generating a set of one or more source blocks from the plurality of data bursts, wherein data from at least one source block of the set of source blocks is from more than one data burst;

generating one or more repair symbols from the one or more source blocks;

generating a plurality of transport bursts from the plurality of data bursts and the repair symbols, comprising:

(i) including a complete data burst within a transport burst, whereby each data packet included in the transport burst contains the position of the data packet in the data burst;

(ii) including, in at least one of the transport bursts, repair packets that include one or more repair symbols at least one of which is a repair symbol for more than one of the data bursts, wherein a repair packet also includes data about the repair packet's repair symbols;

(iii) including, in each transport burst, the unique burst identifier for the data burst that is in that transport burst; and (iv) including, in each transport burst, parameters selected from a plurality of parameters that describe a plurality of repair schemes, such that the parameters indicate repair scheme details used for generating the repair packets of that transport burst; and sending at least some of the plurality of transport bursts to the channel.

2. The method of claim 1, further comprising:
including, in each transport burst that contains repair symbols, a field to distinguish repair symbols from data of a data burst.

3. The method of claim 1, wherein generating the set of one or more source blocks from the plurality of data bursts further comprises:

placing data of the plurality of data bursts into locations in the set of one or more source blocks according to a mapping such that, from the location of data in a source block and the particular source block, the unique identifier of the data's data burst and a position of the data in its data burst is determinable.

4. A method for conveying data over a channel by a transmitter, wherein the transmitter is a transmitter initialized using a set of initialization parameters that are used in a sequence generation process, the method comprising:

generating a sequence of a plurality of data bursts, wherein each of the plurality of data bursts is assigned a unique identifier i;

inserting data bursts into one or more source blocks by a one-to-one mapping, whereby the source block number and the position of data in the source block is a function of the unique identifier i and the data's position in the data burst;

generating repair symbols from a source block after the source block is generated;

generating a sequence of a plurality of transport bursts from the plurality of data bursts and the repair symbols, comprising:

(i) including a complete data burst within a transport burst, whereby each data packet included in the transport burst contains the position of the data packet in the data burst;

(ii) including, in each transport burst, repair packets that include one or more repair symbols from one or more source blocks, wherein the repair packets also include data on repair symbol identifiers for the repair packet's repair symbols;

(iii) including, in each transport burst, the identifier i;

(iv) including, in each transport burst, parameters selected from a plurality of parameters that describe a plurality of repair schemes, such that the parameters indicate repair scheme details used for generating the repair packets; and sending at least some of the plurality of transport bursts to one or more receivers.

5. The method of claim 4, wherein the parameters included in each transport burst relate to the repair packets of that transport burst and include a selection from among a plurality of FEC code selections, an indication of a number used in an FEC process for the number of source symbols per block and an indication of a number used in an FEC process for the number of repair symbols per block, wherein the indications of numbers can vary over the plurality of transport bursts.

6. The method of claim 4, wherein the data bursts are outputs of an application and/or an application/transport protocol, the method further comprising:

providing each transport burst to a transport stream process; and providing outputs of the transport stream process to a physical layer element for transmission over a physical layer.

7. The method of claim 6, wherein the transport stream process is an MPEG-2 transport stream process.

8. A transmitter, implemented using program code stored on a non-transitory, computer recordable medium executing on a computer, that conveys data over a channel, comprising:

program code for generating a sequence of a plurality of data bursts, wherein each of the plurality of data bursts is assigned a unique burst identifier;

program code for generating a set of one or more source blocks from the plurality of data bursts, wherein data from at least one source block of the set of source blocks is from more than one data burst;

program code for generating one or more repair symbols from the one or more source blocks;

program code for generating a plurality of transport bursts from the plurality of data bursts and the repair symbols, comprising:

(i) program code for including a complete data burst within a transport burst, whereby each data packet included in the transport burst contains the position of the data packet in the data burst;

(ii) program code for including, in at least one of the transport bursts, repair packets that include one or more repair symbols at least one of which is a repair symbol for more than one of the data bursts, wherein a repair packet also includes data about the repair packet's repair symbols;

(iii) program code for including, in each transport burst, the unique burst identifier, for the data burst that is in that transport burst; and (iv) program code for including, in each transport burst, parameters selected from a plurality of parameters that describe a plurality of repair schemes, such that the parameters indicate repair scheme details used for generating the repair packets of that transport burst; and program code for sending at least some of the plurality of transport bursts to the channel.

9. The transmitter of claim 8, further comprising program code for including, in each transport burst that contains repair symbols, a field to distinguish repair symbols from data of a data burst.

10. The transmitter of claim 8, wherein program code for generating the set of one or more source blocks from the plurality of data bursts further comprises program code for placing data of the plurality of data bursts into locations in the set of one or more source blocks according to a mapping such that, from the location of data in a source block and the particular source block, the unique identifier of the data's data burst and a position of the data in its data burst is determinable.

11. A transmitter initialized using a set of initialization parameters that are used in a sequence generation process, implemented using program code stored on a non-transitory, computer recordable medium executing on a computer, that conveys data over a channel, comprising:

program code for generating a sequence of a plurality of data bursts, wherein each of the plurality of data bursts is assigned a unique identifier i;

program code for inserting data bursts into one or more source blocks by a one-to-one mapping, whereby the source block number and the position of data in the source block is a function of the unique identifier i and the data's position in the data burst;

program code for generating repair symbols from a source block after the source block is generated;

program code for generating a sequence of a plurality of transport bursts from the plurality of data bursts and the repair symbols, comprising:

(i) program code for including a complete data burst within a transport burst, whereby each data packet included in the transport burst contains the position of the data packet in the data burst;

(ii) program code for including, in each transport burst, repair packets that include one or more repair symbols from one or more source blocks, wherein the repair packets also include data on repair symbol identifiers for the repair packet's repair symbols;

(iii) program code for including, in each transport burst, the identifier i;

(iv) program code for including, in each transport burst, parameters selected from a plurality of parameters that describe a plurality of repair schemes, such that the parameters indicate repair scheme details used for generating the repair packets; and sending at least some of the plurality of transport bursts to one or more receivers.

12. The transmitter of claim 11, wherein the parameters included in each transport burst relate to the repair packets of that transport burst and include a selection from among a plurality of FEC code selections, an indication of a number used in an FEC process for the number of source symbols per block and an indication of a number used in an FEC process for the number of repair symbols per block, wherein the indications of numbers can vary over the plurality of transport bursts.

13. The transmitter of claim 11, wherein the data bursts are outputs of an application and/or an application/transport protocol, the method further comprising:

providing each transport burst to a transport stream process; and providing outputs of the transport stream process to a physical layer element for transmission over a physical layer.

14. The transmitter of claim 13, wherein the transport stream process is an MPEG-2 transport stream process.

15. A transmitter for conveying data over a channel, the transmitter comprising:

means for generating a sequence of a plurality of data bursts, wherein each of the plurality of data bursts is assigned a unique burst identifier;

means for generating a set of one or more source blocks from the plurality of data bursts, wherein data from at least one source block of the set of source blocks is from more than one data burst;

means for generating one or more repair symbols from the one or more source blocks; generating a plurality of transport bursts from the plurality of data bursts and the repair symbols, comprising:

(i) means for including a complete data burst within a transport burst, whereby each data packet included in the transport burst contains the position of the data packet in the data burst;

(ii) means for including, in at least one of the transport bursts, repair packets that include one or more repair symbols at least one of which is a repair symbol for more than one of the data bursts, wherein a repair packet also includes data about the repair packet's repair symbols;

(iii) means for including, in each transport burst, the unique burst identifier for the data burst that is in that transport burst; and (iv) means for including, in each transport burst, parameters selected from a plurality of parameters that describe a plurality of repair schemes, such that the parameters indicate repair scheme details used for generating the repair packets of that transport burst; and sending at least some of the plurality of transport bursts to the channel.

16. A transmitter initialized using a set of initialization parameters that are used in a sequence generation process and that conveys data over a channel, the transmitter comprising:

means for generating a sequence of a plurality of data bursts, wherein each of the plurality of data bursts is assigned a unique identifier i;

means for inserting data bursts into one or more source blocks by a one-to-one mapping, whereby the source block number and the position of data in the source block is a function of the unique identifier i and the data's position in the data burst;

means for generating repair symbols from a source block after the source block is generated;

means for generating a sequence of a plurality of transport bursts from the plurality of data bursts and the repair symbols, comprising:

(i) means for including a complete data burst within a transport burst, whereby each data packet included in the transport burst contains the position of the data packet in the data burst;

(ii) means for including, in each transport burst, repair packets that include one or more repair symbols from one or more source blocks, wherein the repair packets also include data on repair symbol identifiers for the repair packet's repair symbols;

(iii) means for including, in each transport burst, the identifier i;

(iv) means for including, in each transport burst, parameters selected from a plurality of parameters that describe a plurality of repair schemes, such that the parameters indicate repair scheme details used for generating the repair packets; and sending at least some of the plurality of transport bursts to one or more receivers.

\* \* \* \* \*